Jan. 16, 1934.    E. R. FITCH    1,943,593
FLUID PRESSURE BRAKE
Filed July 29, 1932
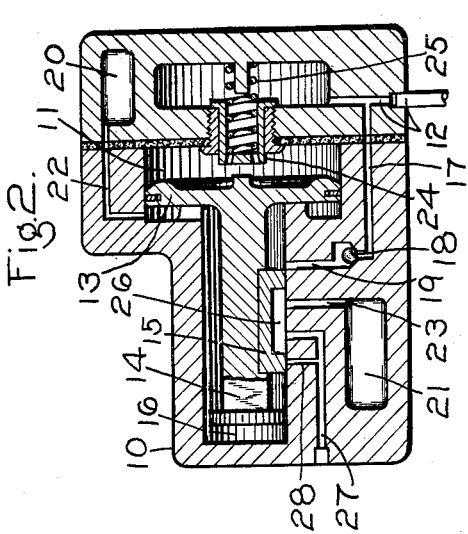
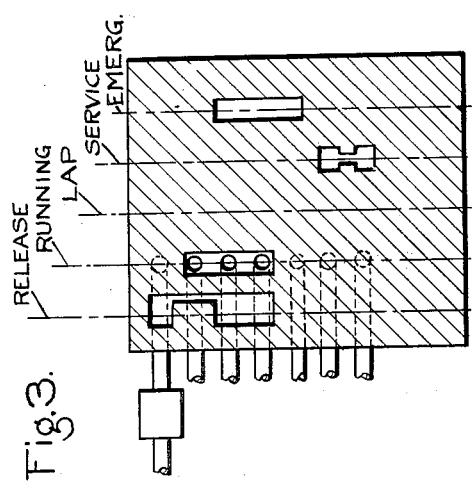
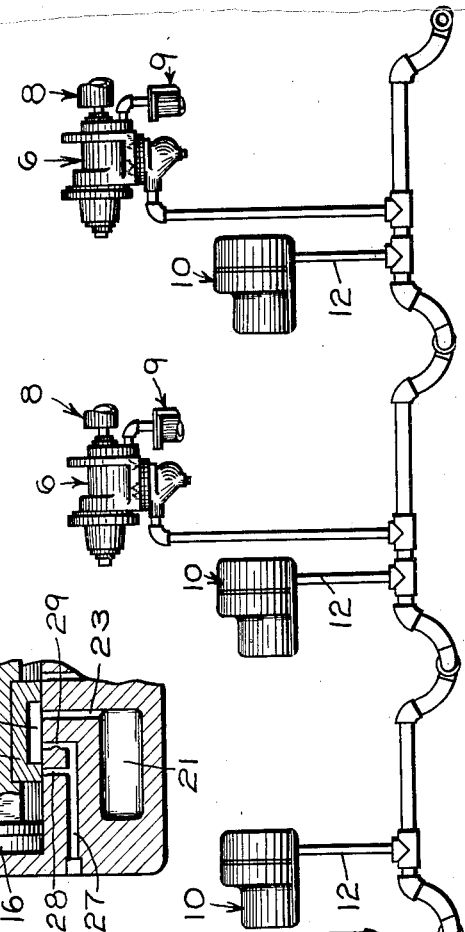
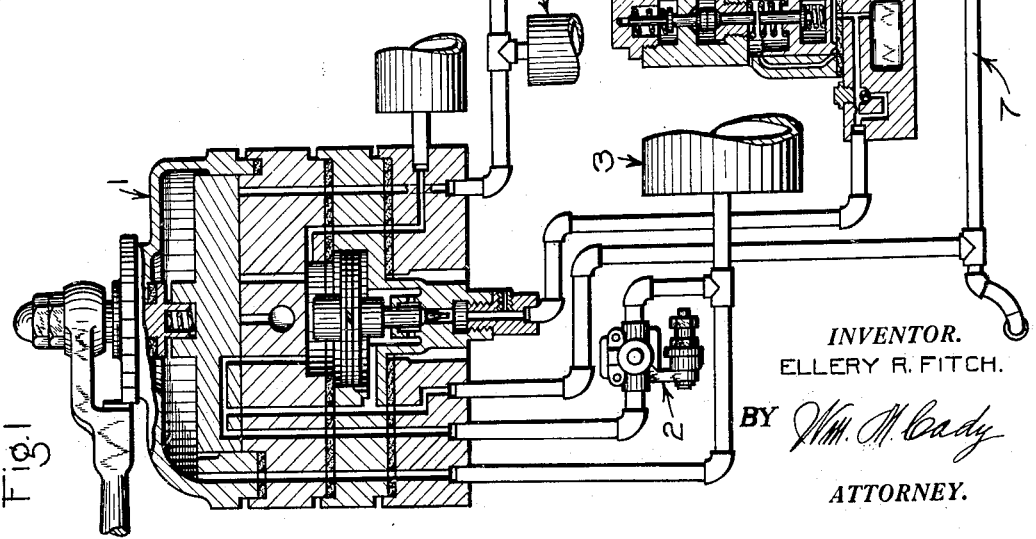
INVENTOR.
ELLERY R. FITCH.
BY *Wm. M. Cady*
ATTORNEY.

Patented Jan. 16, 1934

1,943,593

UNITED STATES PATENT OFFICE 1,943,593

FLUID PRESSURE BRAKE

Ellery R. Fitch, Edgewood, Pa., assignor to The Westinghouse Air Brake Company, Wilmerding, Pa., a corporation of Pennsylvania Application July 29, 1932. Serial No. 625,632

6 Claims. (Cl. 303—38)

This invention relates to automatic fluid pressure brake systems in which the brakes are applied by effecting a reduction in brake pipe pressure and more particularly to that type of system which is disclosed in the following pending applications for United States Letters Patent, Serial No. 563,278, filed September 17, 1931, and Serial No. 624,247, filed July 23, 1932.

In the handling of long trains it is highly desirable to apply the brakes on cars at the rear end of the train as nearly as possible in synchronism with the application of the brakes on the cars at the head end of the train, so as to prevent slack in the train from running in at such a rate as to cause excessive and damaging shocks.

As pointed out in each of the above identified applications, in order to accomplish this result, a fluid pressure brake system is provided which embodies means located on the locomotive for effecting successive reductions in brake pipe pressure and which embodies sensitive and yet stable means located on cars of the train which are responsive to each reduction in brake pipe pressure, effected through the operation of the means on the locomotive, for effecting corresponding successive local reductions in brake pipe pressure.

The present invention is principally concerned with the local venting of fluid under pressure from the brake pipe on the cars of the train and more particularly with the means for controlling of the local venting of fluid and has for its principal object the provision of an improved sensitive and stable valve mechanism on cars of the train which is responsive to successive reductions in brake pipe pressure effected by either manually or automatically operated means on the locomotive, for positively effecting corresponding successive local reductions in brake pipe pressure.

In the accompanying drawing; Fig. 1 is a diagrammatic view of a fluid pressure brake equipment for a train and embodying my invention; Fig. 2 is an enlarged sectional view of the quick service venting valve device employed on cars of the train; Fig. 3 is a diagram showing the connections made in the different operating positions of the brake valve device; and Fig. 4 is a fragmentary sectional view showing a modification of the quick service venting valve device.

The fluid pressure brake system shown in the drawing may comprise the usual locomotive brake equipment. Only the brake valve device 1, feed valve device 2 and main reservoir 3 of the usual locomotive brake equipment is actually shown in the drawing since it is thought that the invention will be more readily understood without the other parts of the locomotive brake equipment being shown.

In addition to the usual locomotive brake equipment, a mechanism is provided for automatically effecting successive reductions in brake pipe pressure. This mechanism is identical with the corresponding mechanism fully described in the aforementioned application, Serial No. 563,278, but it will be understood that the mechanism disclosed in the aforementioned application, Serial No. 624,247, or any other suitable mechanism may be employed instead of the mechanism shown.

Since the locomotive mechanism for automatically effecting successive reductions in brake pipe pressure has been fully described in the application serially numbered 563,278, a detailed description in the present application, of this mechanism and its functions is deemed unnecessary.

Briefly described, this additional mechanism carried by the locomotive comprises a valve device 4 and a reduction limiting reservoir 5, which function so long as the brake valve device is in service position to automatically effect successive light wave-like predetermined reductions in brake pipe pressure.

On each car of the train is provided the usual brake controlling valve device, such as the triple valve device 6 which is operated in the usual manner upon a reduction in pressure in the brake pipe 7 to effect an application of the brakes and upon an increase in brake pipe pressure to effect a release of the brakes. The brake equipment on each car also comprises the usual auxiliary reservoir 8, a brake cylinder 9 and a quick service brake pipe venting valve device 10.

The quick service brake pipe venting valve device 10 is adapted to be operated upon a reduction in brake pipe pressure for effecting a local venting of fluid from the brake pipe 7. As shown in the drawing, this valve device 10 may comprise a casing having a chamber 11 connected through a passage and pipe 12 with the brake pipe 7 and containing a piston 13 having a stem 14 adapted to operate a slide valve 15 contained in a chamber 16 to which the brake pipe is normally connected by way of pipe and passage 12, a branch passage 17, past a ball check valve 18 and passage 19.

The casing of the valve device 10 has formed therein a quick service control chamber 20 and a quick service chamber or bulb 21, the chamber 20 being constantly open, through a passage 22 to the valve chamber 16, and the bulb 21 being open to a passage 23 leading to the seat for the slide valve 15.

For the purpose of preventing the piston 13 from accidentally moving to quick service position under the usual unintentional fluctuations in brake pipe pressure, a stabilizing mechanism is provided comprising a stop member 24 which is slidably mounted in the casing and which is subjected on one side to the pressure of a coil spring 25. If upon the fluctuations in brake pipe pressure the piston 13 moves outward from the position in which it is shown in Fig. 2 toward quick service position, the member 24 will engage and stop the piston short of quick service position, thus preventing unintentional venting of fluid under pressure from the brake pipe.

In operation when the brake valve device 1 is in running position, as shown in Fig. 1 of the drawing, the brake pipe 7 is maintained charged with fluid at feed valve pressure in the manner described in application serially numbered 563,278.

On each car of the train the triple valve device 6 and auxiliary reservoir 8 are charged with fluid under pressure from the brake pipe in the usual manner and, with the triple valve device in release position, the brake cylinder 9 is open to the atmosphere in the usual manner.

With the piston 13 and slide valve 15 of the valve device 10 in their normal or extreme inner position as shown in Fig. 2, fluid under pressure flows from the brake pipe 7 through pipe and passage 12 to the piston chamber 11 and from the passage 12 flows through passage 17, past ball check valve 18 and through passage 19 to the valve chamber 16 and from thence flows through passage 22 to the quick service control chamber 20, thus charging the piston chamber, valve chamber and quick service control chamber with fluid at brake pipe pressure.

With the slide valve 15 in its normal position, as shown in Fig. 2, the quick service bulb 21 is open to the atmosphere through passage 23, a cavity 26 in the slide valve 15 and a passage 27.

In order to effect a service application of the brakes, the rotary valve of the brake valve device 1 is turned to service position in which the valve device 4 will be caused to function automatically, in the same manner as described in application serially numbered 563,278, to effect a series of successive light reductions in brake pipe pressure.

On the cars of the train, the initial reduction in brake pipe pressure produced by the apparatus on the locomotive, causes a corresponding reduction in fluid pressure in the piston chamber 11 of the valve device 10. Due to the ball check valve 18 preventing back flow of fluid from the valve chamber 16 to the brake pipe, the brake pipe reduction cannot effect a reduction in the pressure of fluid in the valve chamber 16, consequently a pressure differential is quickly created on the piston 13 which causes the piston to move to its extreme outer position against the opposing pressure of the spring-pressed stop 24, the piston shifting the slide valve 15 to its extreme outer position.

With the slide valve in this position, the cavity 26 connects the passage 19 to the passage 23 so that fluid under pressure now flows from the brake pipe to and equalizes in the quick service bulb 21, thus producing a predetermined local venting of fluid from the brake pipe which is effected serially on the cars of the train from the front to the rear.

At substantially the same time as the cavity 26 connects the passages 19 and 20, the slide valve 15 uncovers a passage 28 connected to the passage 27 leading to the atmosphere, so that fluid under pressure flows from the valve chamber 16 and chamber 20 to the atmosphere, thus effecting a reduction in the pressure of fluid in these chambers.

Now when the pressure of fluid in valve chamber 16 has reduced to a degree slightly below the pressure of fluid in the piston chamber 11, the piston 13 and thereby the slide valve 15 will be caused to move from their extreme outer position to their extreme inner or normal position, in which latter position the piston and slide valve are shown in Fig. 2.

As the slide valve is thus being moved toward its inner position, it first laps the passage 19, thus closing communication from the brake pipe to the quick service bulb, then upon further movement, the cavity 26 connects the passage 23 to the passage 27 so that fluid under pressure in bulb 21 now flows to the atmosphere, then upon further movement the valve laps the passage 28, thus closing the communication from the valve chamber 16 to the atmosphere, and finally the valve uncovers the passage 19, so that the brake pipe is again in communication with the valve chamber 16.

The volume of the valve chamber 16 and chamber 20 and the flow capacity of the passage 28 are such as to insure the piston 13 and slide valve 15 remaining in quick service position until the desired brake pipe reduction is effected, which, in the present embodiment of the invention is until the pressures of fluid in the brake pipe and bulb equalize.

The flow capacity of the communication from the bulb 21 to the atmosphere, which communication is formed by the passage 23, cavity 26 in the slide valve and passage 27 when the slide valve is in its inner or normal position, is such as to permit the rapid venting of fluid from the bulb 21.

Now upon each successive reduction in brake pipe pressure effected by the apparatus on the locomotive, the valve device 10 will function, as before described, to locally vent fluid under pressure from the brake pipe.

It will here be understood that the piston 13 and slide valve 15 will quickly move to quick service position upon a reduction in brake pipe pressure effected by the apparatus on the locomotive and that the piston and slide valve will be returned to their inner or normal position and permit the complete venting of fluid under pressure from the quick service bulb 21, before a succeeding reduction in brake pipe pressure is effected.

If the piston 13 and slide valve 15 should be unintentionally moved from their inner or normal position due to fluctuations in brake pipe pressure which may be caused by leakage of fluid from the brake pipe, or by variations in the operation of the feed valve device, the slide valve, in its traverse, will first lap the passage 19, thus closing communication from the brake pipe to the valve chamber 16 and will then uncover the passage 28 so as to permit fluid under pressure to flow from the valve chamber and connected chamber 20 to the atmosphere. At substantially the same time as the passage 28 is being uncovered by the slide valve, the piston engages the spring-pressed stop which resists further outward movement of the piston. It will thus be seen that the differential pressure created on the piston 13, due to the flow of fluid from the valve chamber 16, and the action of the stop 24, cooperate to bring the piston and slide valve to a stop short of their quick service position.

As a consequence, the quick service valve device is rendered stable and is not responsive to unintentional fluctuations in brake pipe pressure to effect a local quick service reduction in brake pipe pressure.

In other words, my improved vent valve device will operate to effect a local quick service reduction in brake pipe pressure only when the reduction in brake pipe pressure, effected by the apparatus on the locomotive, is at a desired predetermined rate.

In Fig. 4 of the drawing, a modification of the quick service brake pipe venting valve device 10 is illustrated which differs from the valve device shown in Fig. 2 in that there is a restriction 29 interposed in the passage 27 at a point between the slide valve seat and the juncture of the passages 28 and 27, which is adapted to so retard the flow of fluid from the bulb 21 to the atmosphere when the slide valve is returned from its quick service position to its inner or normal position that the bulb will not be completely depleted of fluid under pressure by the time a succeeding reduction in brake pipe pressure causes the piston and valve 15 to again move to quick service position.

With a valve device 10 constructed in accordance with this modification, the initial local reduction in brake pipe pressure will be heavier than each of the succeeding local reductions for the reason that upon the initial operation of the piston 13 and slide valve 15 to quick service position, fluid flows from the brake pipe to the completely vented bulb 21, whereas upon the successive operations of the piston and slide valve to quick service position, fluid flows from the brake pipe to the partially charged bulb. As a result more fluid under pressure will be supplied to the brake cylinder during the initial application than on each subsequent application. This may be desirable since more fluid is required to fill up the volume of the brake cylinder as the brake cylinder piston (not shown) is moved outwardly until the usual brake shoes are in engagement with the car wheels than is required when the shoes are in engagement with the wheels.

From the foregoing description it will be seen that the vent valve devices 10 on cars of the train respond quickly to a light reduction in brake pipe pressure at a predetermined rate to effect a light predetermined local reduction in brake pipe pressure so that the transmission time from the front to the rear of the train is greatly reduced as compared with previous devices, which results in the brakes on cars at the rear end of the train being applied more nearly in synchronism with the brakes on cars at the head end of the train, and that when the locomotive apparatus for effecting successive light reductions in brake pipe pressure is employed, the brake pipe pressure can be reduced throughout the train to any desired degree, so as to produce the desired brake application.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a fluid pressure brake, the combination with a brake pipe and a brake controlling valve device operable upon a reduction in brake pipe pressure for effecting an application of the brakes, of a valve mechanism separate from said brake controlling valve device and operable to effect a local reduction in brake pipe pressure, said mechanism comprising a control chamber normally charged with fluid under pressure from the brake pipe, valve means subject to the opposing pressures of the brake pipe and control chamber operable upon a light reduction in brake pipe pressure at a predetermined rate to a position for venting fluid under pressure from the brake pipe to effect a local reduction in brake pipe pressure, a valve operative to a position for venting fluid under pressure from the brake pipe, a piston subject to the opposing pressures of the brake pipe and control reservoir operable upon a reduction in brake pipe pressure for actuating said valve, a passage around said piston through which fluid under pressure is supplied from the brake pipe to the control chamber and adapted to be closed upon the initial movement of said valve, means operative upon further movement of said valve for venting fluid under pressure from the control chamber and means operative upon still further movement of the valve for venting fluid under pressure from the brake pipe, and means for yieldably opposing the final movement of the valve.

2. In a fluid pressure brake, the combination with a brake pipe and a brake controlling valve device operable upon a reduction in brake pipe pressure for effecting an application of the brakes, of a valve mechanism separate from said brake controlling valve device and operable to effect a local reduction in brake pipe pressure, said mechanism comprising a control chamber normally charged with fluid under pressure from the brake pipe, valve means subject to the opposing pressures of the brake pipe and control chamber operable upon a light reduction in brake pipe pressure at a predetermined rate to a position for venting fluid under pressure from the brake pipe to effect a local reduction in brake pipe pressure, a valve operative to a position for venting fluid under pressure from the brake pipe, a piston subject to the opposing pressures of the brake pipe and control reservoir operable upon a reduction in brake pipe pressure for actuating said valve, a passage around said piston through which fluid under pressure is supplied from the brake pipe to the control chamber and adapted to be closed upon the initial movement of said valve, means operative upon further movement of said valve for venting fluid under pressure from the control chamber and means operative upon still further movement of the valve for venting fluid under pressure from the brake pipe, and means cooperating with said piston for yieldably opposing the final movement of the valve.

3. In a fluid pressure brake, the combination with a brake pipe and a brake controlling valve device operable upon a reduction in brake pipe pressure for effecting an application of the brakes, of a valve mechanism separate from said brake controlling valve device and operable to effect a local reduction in brake pipe pressure, said mechanism comprising a control chamber normally charged with fluid under pressure from the brake pipe, valve means subject to the opposing pressures of the brake pipe and control chamber operable upon a light reduction in brake pipe pressure at a redetermined rate to a position for venting fluid under pressure from the brake pipe to effect a local reduction in brake pipe pressure, a valve operative to a position for venting fluid under pressure from the brake pipe, a piston subject to the opposing pressures of the brake pipe and control reservoir operable upon a reduction in brake pipe pressure for actuating said valve, a passage around said piston through which fluid under pressure is supplied from the brake pipe to the control chamber and adapted to be closed upon the initial movement of said valve, means operative upon further movement of said valve for venting fluid under pressure from the control chamber and means operative upon a still further movement of the valve for venting fluid under pressure from the brake pipe, and means for preventing back flow of fluid from said control chamber to the brake pipe.

4. In a fluid pressure brake, the combination with a brake pipe and a brake controlling valve device operable upon a reduction in brake pipe pressure for effecting an application of the brakes, of a valve mechanism separate from said brake controlling valve device and operable to effect a local reduction in brake pipe pressure, said mechanism comprising a control chamber normally charged with fluid under pressure from the brake pipe, valve means subject to the opposing pressures of the brake pipe and control chamber operable upon a light reduction in brake pipe pressure at a predetermined rate to a position for venting fluid under pressure from the brake pipe to effect a local reduction in brake pipe pressure, a valve operative to a position for venting fluid under pressure from the brake pipe, a piston subject to the opposing pressures of the brake pipe and control reservoir operable upon a reduction in brake pipe pressure for actuating said valve, a passage around said piston through which fluid under pressure is supplied from the brake pipe to the control chamber and adapted to be closed upon the initial movement of said valve, means operative upon further movement of said valve for venting fluid under pressure from the control chamber and means operative upon still further movement of the valve for venting fluid under pressure from the brake pipe, and a check valve for preventing back flow of fluid from said control chamber to the brake pipe by way of said passage.

5. In a fluid pressure brake, the combination with a brake pipe and a brake controlling valve device operable upon a reduction in brake pipe pressure for effecting an application of the brakes, of a valve mechanism separate from said brake controlling valve device and operable to effect a local reduction in brake pipe pressure, said mechanism comprising a control chamber normally charged with fluid under pressure from the brake pipe, valve means subject to the opposing pressures of the brake pipe and control chamber operable upon a light reduction in brake pipe pressure at a predetermined rate to a position for venting fluid under pressure from the brake pipe to effect a local reduction in brake pipe pressure, a valve operative to a position for venting fluid under pressure from the brake pipe, a piston subject to the opposing pressures of the brake pipe and control reservoir operable upon a reduction in brake pipe pressure for actuating said valve, a passage around said piston through which fluid under pressure is supplied from the brake pipe to the control chamber and adapted to be closed upon the initial movement of said valve, means operative upon further movement of said valve for venting fluid under pressure from the control chamber and means operative upon still further movement of the valve for venting fluid under pressure from the brake pipe, and means for preventing back flow of fluid from the control chamber to the brake pipe by way of said passage when a reduction in brake pipe pressure is initiated.

6. In a fluid pressure brake, the combination with a brake pipe and a brake controlling valve device operable upon a reduction in brake pipe pressure for effecting an application of the brakes, of a valve mechanism separate from said brake controlling valve device and operable to effect a local reduction in brake pipe pressure, said mechanism comprising a control chamber normally charged with fluid under pressure from the brake pipe, valve means subject to the opposing pressures of the brake pipe and control chamber operable upon a light reduction in brake pipe pressure at a predetermined rate to a position for venting fluid under pressure from the brake pipe to effect a local reduction in brake pipe pressure, a valve operative to a position for venting fluid under pressure from the brake pipe, a piston subject to the opposing pressures of the brake pipe and control reservoir operable upon a reduction in brake pipe pressure for actuating said valve, a passage around said piston through which fluid under pressure is supplied from the brake pipe to the control chamber and adapted to be closed upon the initial movement of said valve, means operative upon further movement of said valve for venting fluid under pressure from the control chamber and means operative upon still further movement of the valve for venting fluid under pressure from the brake pipe, and means for preventing back flow of fluid from the control chamber to the brake pipe by way of said passage during the interval of time elapsing between the initiation of a brake pipe reduction and the movement of said valve to close said passage.

ELLERY R. FITCH.